June 26, 1928.  1,674,692
C. J. McHUGH ET AL
PORTABLE ELECTRIC ROASTER
Filed Nov. 30, 1926
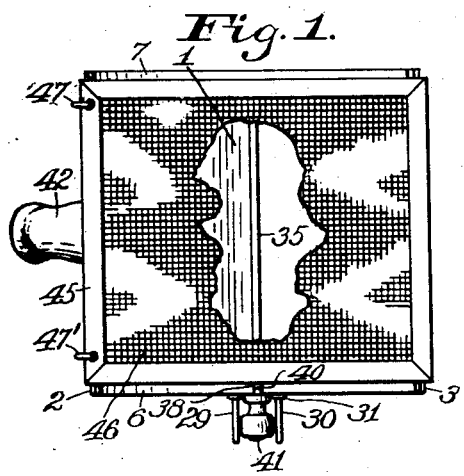
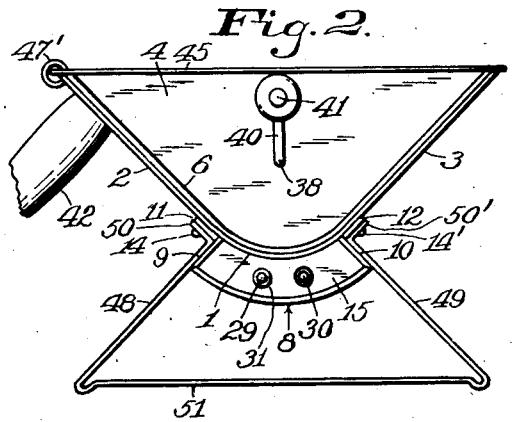
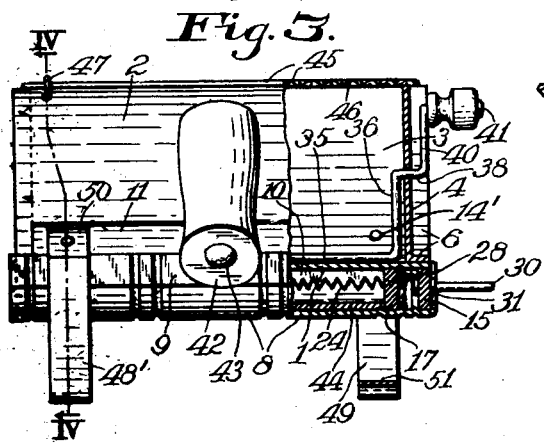
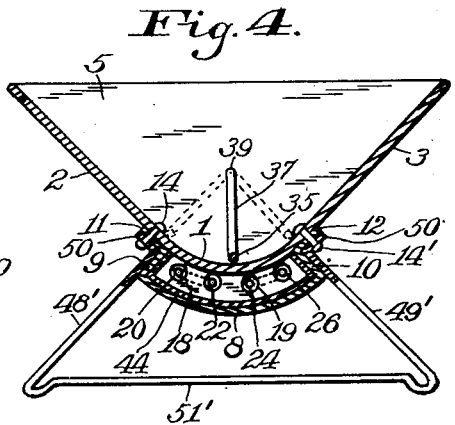
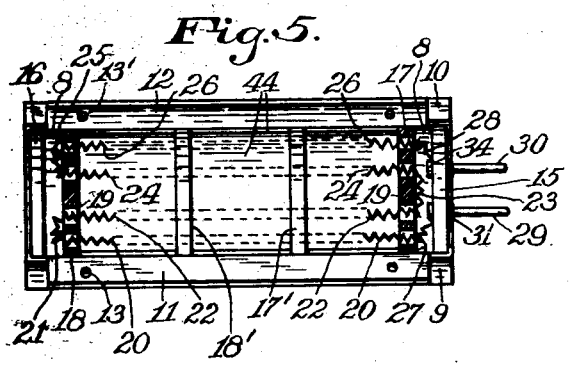
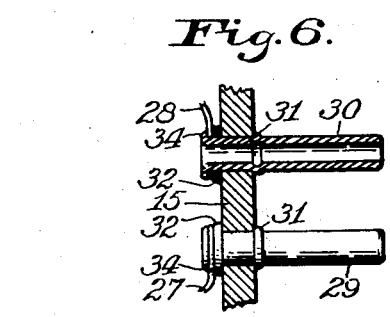
INVENTORS:
Charles J. McHugh,
Durward S. Revers,
By E. T. Silvius,
ATTORNEY.

Patented June 26, 1928.

1,674,692

UNITED STATES PATENT OFFICE.

CHARLES J. McHUGH AND DURWARD S. RIVERS, OF INDIANAPOLIS, INDIANA, ASSIGNORS TO THE TI-CO. MANUFACTURING CO., OF INDIANAPOLIS, INDIANA, A CORPORATION OF INDIANA.

PORTABLE ELECTRIC ROASTER.

Application filed November 30, 1926. Serial No. 151,730.

This invention relates to a unitary device whereby to roast grains of corn, wheat or other substances, pop corn, or heat such cereals as are commonly used as breakfast food, the invention having reference more particularly to a portable roaster that is adapted to be readily handled and having a heater incorporated therewith ready for instant use.

An object of the invention is to provide a roaster of such character as to be adapted for popping corn as well as for heating or roasting various substances, and not be liable to over-heat and damage the substances.

Another object is to provide an improved portable electric roaster which shall be adapted to be constructed suitably for domestic use to enable families to readily pop small quanties of corn, to roast coffee or other grains, or to heat and dry food substances that may have become damp.

A further object is to provide a portable electric roaster which shall be of such construction as to be simple and permit rapid manufacture at such low cost as to be readily salable, and yet be highly meritorious for a variety of purposes in households or elsewhere, and which shall be durable and economical in use.

With the above-mentioned and other objects in view, the invention consists in a novel retaining vessel having a heater beneath it, the vessel being provided with means to agitate or stir substances therein, and having also improved supporting legs, the invention consisting also further in the parts and combinations and arrangements of parts as hereinafter particularly described and claimed.

Referring to the drawings,—Figure 1 is a top plan of the improved roaster, a portion of the cover thereof being broken away to expose the necessary agitator; Fig. 2 is an end elevation of the roaster, on an enlarged scale, a portion of the handle thereof being broken off; Fig. 3 is a side view of the roaster, a portion being in vertical central section; Fig. 4 is a transverse section approximately on the line IV—IV on Fig. 3, the cover of the vessel being omitted; Fig. 5 is a top plan of the electrical heater comprised in the roaster; and Fig. 6 is a fragmentary sectional detail view showing improved electrical connections.

Similar reference characters in the different figures of the drawings indicate corresponding elements or features of construction herein referred to in detail.

In a practical embodiment of the invention a retaining vessel is provided which has a concave bottom 1 that is curved in only one direction and straight in the other, and inclined plane sides 2 and 3 extending divergently upward from the bottom, vertical ends 4 and 5 being suitably secured thereto, preferably by means of flanges 6 and 7. The bottom of the vessel has a heater beneath it which preferably is electrical and comprises a heater box having a curved bottom 8 and sides 9 and 10 provided with flanges 11 and 12, the flanges having apertures 13 and 13' suitable for receiving rivets 14 and 14' whereby the box is secured to the inclined sides of the vessel. The box has no cover other than the bottom 1 of the vessel but has two opposite ends 15 and 16 and partititions 17 and 18 in proximity to the ends, and also similar partitions 17' and 18' intermediately of the other partitions to support an electrical resistance coil or heating element. Each of the partitions has a plurality of holes 19 therein, preferably four in number in which to support an electrical resistance coil which preferably comprises a main portion 20 extending through all the partitions adjacent to one end thereof, a tie portion 21 at the outer side of the partition 18, a main portion 22 extending thence through all the partitions, a tie portion 23 extending thence across the middle portion of the partition 17, a main portion 24 extending thence through all the partitions, a tie portion 25 extending thence along the outer side of the partition 18, and a main portion 26 extending thence through all the partitions adjacent to all the opposite ends, the main portions 20 and 26 having terminal wires 27 and 28 connected therewith respectively that are suitably connected with connection studs 29 and 30 secured in the box end 15 at a suitable distance apart for connection with a standard connection plug of well-known construction for conducting electrical current by means of a cable from an electric service socket. Preferably the studs are composed of small tubing and having each a collar 31 swaged thereon to constitute a shoulder which is seated against the end 15, the adjacent portion constituting a shank which extends through said end and has a washer 32 thereon at the inner side of said end, the terminal wires being wrapped about the shanks against the washers, after which the end of the shank is swaged over to form a retaining flange 34 against the terminal wire.

An agitator is provided which comprises a straight rod 35 having arms 36 and 37 on its opposite ends adapted to constitute hanger rods that are provided with pivotal shafts 38 and 39 rotatively supported in the ends 4 and 5 respectively to guide the rod 35 on the concave vessel bottom 1, the shaft 38 having a rocker arm 40 on its outer end that is provided with a crank handle 41 whereby to operate the agitator. One of the inclined sides of the vessel has a handle 42 secured thereto, preferably by means of a bolt 43 whereby to carry the roaster or to steady it while operating the agitator. Preferably the bottom 8 and sides of the heater box is provided with a lining 44 to prevent radiation of heat downwardly and sidewise from the box.

The top of the vessel usually is provided with a cover which preferably comprises a frame 45 and a reticulate web, such as wire netting 46 secured to the frame, and the frame preferably is hingedly connected to the vessel, as by means of rings 47 and 47' connected with the frame and the upper portion of one of the inclined sides of the vessel.

The roaster is provided with suitable means to support the vessel and the heater, preferably comprising a pair of inclined legs 48 and 49 adjacent to one end thereof and a pair of similiar legs 48' and 49' adjacent to the opposite end of the vessel, the two of each pair being arranged on opposite sides respectively of the heater box and having relatively angular head plates 50 and 50' that are arranged against the flanges 11 and 12 and secured in place by the rivets 14 and 14' respectively, the rivets having upset ends or heads on the top of the inclined sides 2 and 3 so that they serve as stops to limit movements of the agitator rod 35. The legs are inclined so as to extend divergently from the heater box and one pair has a tie bar 51 integral with the lower portions thereof, the other pair having a similiar tie bar 51' integral therewith.

In practical use an electrical conducting cable is connected with the posts 29 and 30 or disconnected therefrom at will. Heat from the resistance coil is imparted to the vessel bottom and the substance to be heated or roasted is placed in the vessel and covered. The agitator is operated to-and-fro to prevent over-heating of the substances and insure uniform heating of the substances such as grains of corn, coffee or other substances; and when corn is being popped the cover prevents the popping corn from escaping from the vessel while permitting observation of the process and result of heating the substances. The heat may be variously regulated according to requirements as is understood. Finally the cover may be lifted and by means of the handle 42 the roaster may be turned over sufficiently to discharge the substances therefrom.

What is claimed as new is:

1. A portable electric roaster including a broad-top vessel having a relatively narrow concave bottom, a handle secured to the upper portion of the vessel, a reticulate cover hingedly connected to the vessel adjacent to the handle, an electric heater secured beneath the concave bottom, and an agitator supported in the vessel to swing across the concave bottom thereof.

2. A portable roaster having a vessel comprising a concave bottom and two opposite inclined sides and also two opposite ends, a heater secured beneath the concave bottom, an agitator arranged to operate upon the concave bottom and having hangers pivotally supported in the vessel ends, one of the hangers being provided with a rocker arm outside the vessel, and a handle secured to one of the inclined sides of the vessel.

3. An electric roaster including a vessel comprising a concave bottom and opposite inclined sides and also two opposite ends the concave bottom having an electrical heater on its under side and also a plurality of inclined supporting legs arranged on opposite sides of the heater, an agitator supported by the vessel ends to operate upon the concave bottom and having a rocker arm outside the vessel, and electrical connection studs on one end of the heater having connection with the heater element.

4. A portable electric roaster including a vessel having a concave bottom and a flat reticulate cover and also a handle secured to the vessel adjacent to the cover, an electric heater, secured beneath the concave bottom of the vessel and having terminal studs, an agitator supported in the vessel to swing across the concave bottom and having a rocker arm thereon, and a plurality of pairs of legs secured to the vessel at opposite sides of the heater, the two of each pair of legs being relatively divergent and having a tie bar integral therewith.

5. A portable electric roaster comprising a vessel having a concave bottom and opposite inclined sides and also two opposite vertical ends, legs secured to each of the inclined sides, a heater box arranged beneath the concave bottom and secured to the legs and said sides, two connection studs secured to one end of said box, an electric heater coil supported in said box and having electrical connection with said studs, a handle secured to one of said inclined sides, and an agitator comprising a rod arranged upon said bottom and two hanger rods on opposite ends thereof at the inner side of said ends, the hanger rods having pivotal shafts supported in said ends, one of said shafts having a rocker arm thereon outside the end.

6. In an electrical roaster, the combination of a broad-top retaining vessel having a concave bottom, a plurality of inclined legs and a heater box having members secured together to the vessel, the heater box having opposite end members and intermediate partitions, a pair of electrical connection studs secured to one of said end members, a resistance coil supported in said partitions and having electrical connection with said studs, a reticulate cover connected to the vessel, an agitator movably supported in the vessel, and a handle secured to the upper portion of said vessel.

In testimony whereof, we affix our signatures on the 24th day of November, 1926.

CHARLES J. McHUGH.
DURWARD S. RIVERS.